US008170554B2

(12) United States Patent
Souissi et al.

(10) Patent No.: US 8,170,554 B2
(45) Date of Patent: May 1, 2012

(54) COMPLETE MESSAGE DELIVERY TO MULTI-MODE COMMUNICATION METHOD

(75) Inventors: Slim Souissi, San Diego, CA (US); John Jun Wu, San Diego, CA (US); ChengChang Huang, San Diego, CA (US); Simon Lee, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 717 days.

(21) Appl. No.: 12/144,566

(22) Filed: Jun. 23, 2008

(65) Prior Publication Data

US 2008/0261594 A1 Oct. 23, 2008

Related U.S. Application Data

(62) Division of application No. 10/098,637, filed on Mar. 13, 2002, now Pat. No. 7,392,039.

(51) Int. Cl.
*H04W 4/00* (2009.01)

(52) U.S. Cl. .................................... 455/435.3; 709/208
(58) Field of Classification Search .................. 709/208; 455/435.3
See application file for complete search history.

(56) References Cited

U.S. PATENT DOCUMENTS

2003/0140107 A1* 7/2003 Rezvani et al. ............... 709/208
* cited by examiner

*Primary Examiner* — William D Cumming
(74) *Attorney, Agent, or Firm* — AlbertDhand LLP (57) ABSTRACT

A system and method for complete message delivery to a multi-mode communication device is presented. The communication device is adaptable to communicate with one or more carrier networks and one or more data networks. When a new message is received for the communication device, a message notification is sent to the device via a first network. The communication device parses the message notification and retrieves the complete message via a second network. Alternatively, the message notification may be delivered and the complete message may be retrieved via the same network.

3 Claims, 8 Drawing Sheets

COMPLETE MESSAGE DELIVERY TO MULTI-MODE COMMUNICATION METHOD

CROSS REFERENCE TO RELATED APPLICATION

The present application is a divisional of U.S. patent application Ser. No. 10/098,637, filed Mar. 13, 2002, titled COMPLETE MESSAGE DELIVERY TO MULTI-MODE COMMUNICATION DEVICE, which is hereby incorporated by reference in its entirety and for all purposes.

BACKGROUND

1. Field of the Invention

The present invention generally relates to multi-mode communication devices and more particularly relates to the delivery of complete messages to multi-mode devices over a combination of carrier networks ("WANs") and data networks ("LANs").

2. Related Art

Conventional wireless communication devices typically have separate information applications, such as an email application, that are hosted by the wireless device. New or updated information messages, such as email messages, are usually retrieved from a central information server at the instruction of the user. Additionally, the host wireless communication device may periodically wake up the target information application to prompt the application to contact the central information server and poll the server to see if new or updated information is available. These conventional methods of delivering information messages to wireless devices are inefficient and do not provide for real-time notification of new messages or updated information.

In order for a conventional wireless communication device to use a circuit switched IS95A/B CDMA or GPRS network for email and other wireless information retrieval, the communication device must be connected to the network. When connected, the communication device may poll an information server for updates to information or for the existence of new messages. Thus, a communication device is required to establish a connection just to check for updated information or new messages. If there are no new messages or there is no update, time and other valuable resources are wasted to execute the status check. In some instances, monetary charges may also apply.

Therefore, what is needed is a system and method that overcomes these significant problems found in the conventional systems as described above.

SUMMARY

A system and method for complete message delivery to a multi-mode communication device is presented. The communication device is adaptable to communicate with one or more carrier networks ("WANs") and one or more data networks ("LANs"). When a new message is received for the communication device, a message notification is sent to the device via a first network. The communication device parses the message notification and retrieves the complete message via a second network. Alternatively, the complete message may be retrieved via the first network.

The current location or current network connection status of the communication device is maintained at a network designated as the home network. When the communication device performs an intersystem handoff (i.e. switches from one network to another network), the device updates its location with the home network.

When messages destined for the device are received by the home network, a condensed notification of the complete message is sent to the network in which the device is currently registered. That network can then carry out delivery of the condensed notification to the device. Additionally, the notification message may be encrypted for increased security.

Upon receipt of the condensed notification, the communication device is prompted to initiate a connection with an information server in the home network to download the entire message. The connection with the information server may be open or secure, such as a virtual private network ("VPN") connection.

Messages received by the home network that are destined for the communication device and may be filtered prior to delivery of the condensed notification. The filtering process advantageously determines if the message meets the requirements established for delivery of a message over the particular network (WAN or LAN) to which the communication device is currently connected.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for complete message delivery to a multi-mode communication device. For example, one method as disclosed herein allows for a network to receive a message addressed to a multi-mode communication device and send a message notification to the device. The device parses the message notification and downloads the complete message when appropriate.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
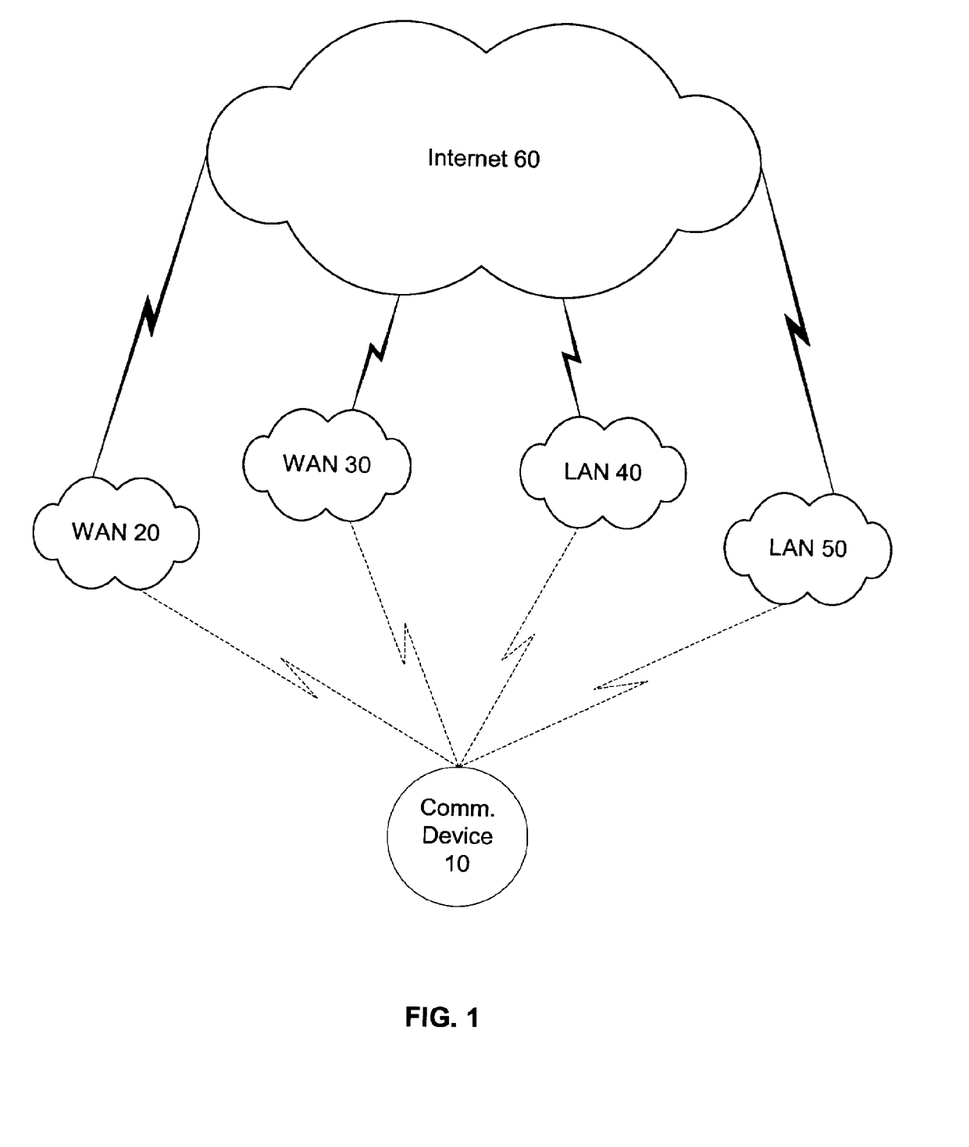
FIG. 1 is a high level network diagram illustrating an example WAN/LAN network architecture with a multi-mode communication device according to an embodiment of the present invention.

FIG. 1 is a high level network diagram illustrating an example hybrid WAN/LAN network architecture with a multi-mode communication device 10. The communication device 10 can be any of a variety of wireless communication devices, including a mobile telephone, personal digital assistant ("PDA"), 10-key device, mobile personal computer, laptop, and palmtop, just to name a few.

Communication device 10 is preferably adaptable to communicate over more than one network type including wireless communication carrier networks such as WAN 20 and WAN 30, and also data communication networks such as LAN 40 and LAN 50. In one embodiment, communication device 10 may communicate over WAN 20 using the GPRS protocol and also communicate over WAN 30 using the CDMA protocol. Other WAN network protocols may also be employed, including 1xRTT, UMTS, and 1xEV. Additionally, communication device 10 may communicate over LAN 40 and LAN 50 using the 802.11(b) network protocol. Other LAN networking protocols may also be employed, including 802.11(a), and home RF.

Communication device 10 is also adaptable to communicate over the various WANs and LANs with people or devices across the accumulation of connected networks commonly referred to as the Internet 60. Examples of communication device 10 operating within the hybrid WAN/LAN network include a wireless telephone call, perhaps established by communication device 10 using a circuit switched voice connection over a GPRS network to a wired or wireless communication device. Additionally, communication device 10 may browse the web or other data resources, using an 802.11(b) data connection to a private corporate LAN, a public LAN in an airport or a coffee house, or a home or apartment complex based residential LAN. Communication device 10 may also send receive work orders, email messages, or simple messaging system ("SMS") messages over the hybrid WAN/LAN network.

Figure 2:
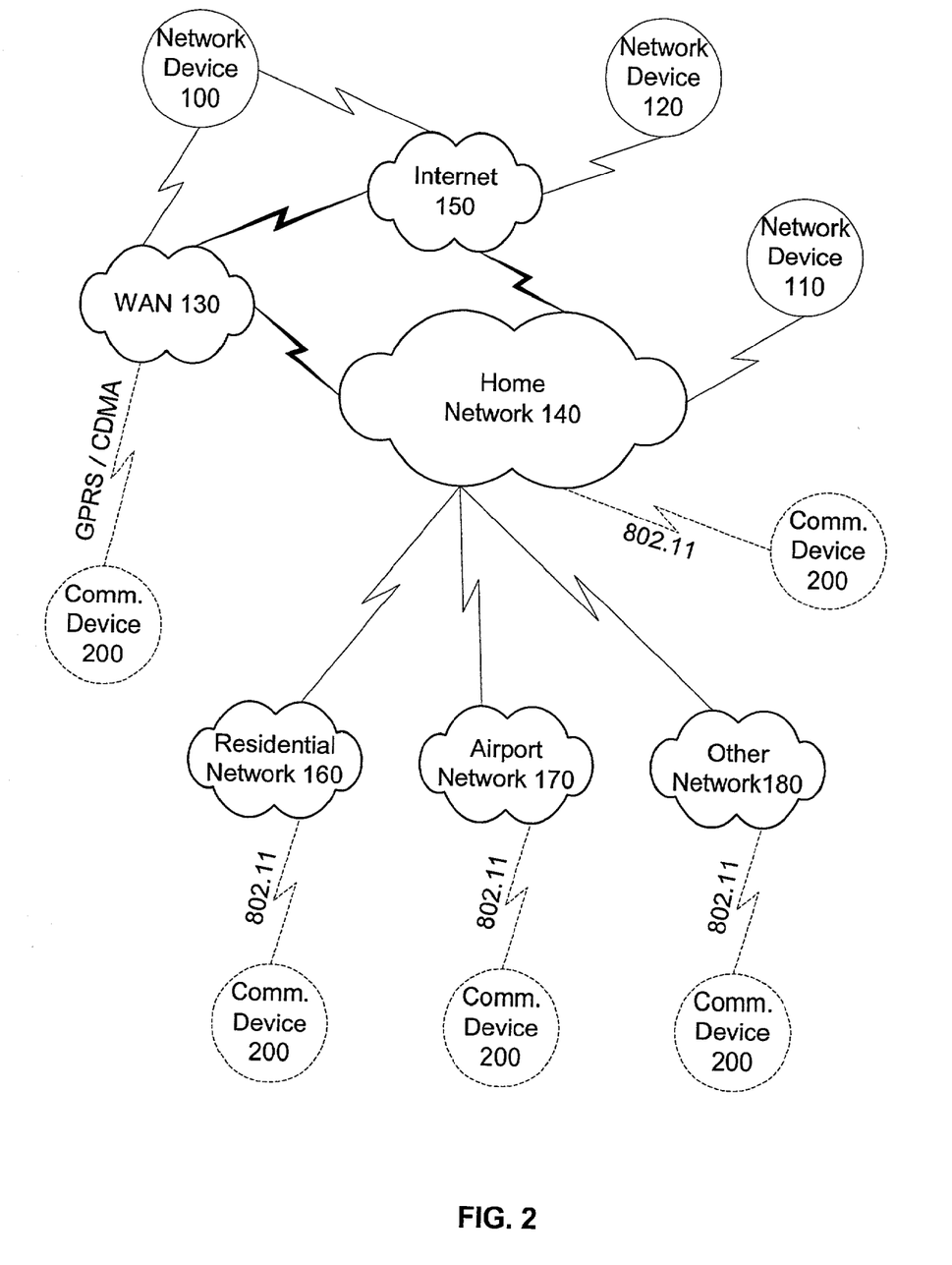
FIG. 2 is a network diagram illustrating an example multi-mode communication device communicating over a hybrid WAN/LAN network architecture with various example network devices according to an embodiment of the present invention.

FIG. 2 is a network diagram illustrating an example multi-mode communication device 200 communicating over a hybrid WAN/LAN network architecture with various example network devices 100, 110, and 120. Network device 100 can be a wireless communication device capable of communicating over a carrier network such as WAN 130. Network device 100 may also be adaptable to communicate over a data communication network such as the ubiquitous Internet 150.

Network device 120 can be a wired or wireless communication device such as a cell phone, PDA, laptop computer, or desktop computer that is in wired or wireless communication with a network that is part of the aggregation of networks commonly known as the Internet 150. Network device 110 can also be a wired or wireless communication device similar to network device 120. Network device 110 may also be adaptable to communicate with a preferred network such as home network 140.

For example, a particular communication device 200 may communicate primarily over a certain network that can be designated as the preferred network, such as home network 140. In one embodiment, home network 140 may be a corporate network with a virtual private network capability or an 802.11(b) wireless connection ability or both. Home network 140 is preferably connected to the Internet 150 as well as other communication devices such as network device 110. Home network 140 can also be advantageously connected to other communication networks such as WAN 130, residential network 160, airport network 170, and various other networks represented by other network 180. These connections may be made directly or through Internet 150.

Communication device 200 is preferably adaptable to communicate over carrier networks such as WAN 130 and data networks such as residential network 160, airport network 170, and other LANs such as a coffee shop LAN, represented by other network 180. As illustrated by the dashed line connecting communication device 200 to the various networks, a single communication device 200 may advantageously communicate through any one of the various WANs or LANs, using the particular protocol and communication means required for that network.

By way of example, communication device 200 can communicate with network device 100 through a GPRS or CDMA connection over WAN 130. Such a communication may be a phone call or an SMS message, for example. Additionally, communication device 200 can communicate with network device 120 through WAN 130 and Internet 150. Alternate network paths are also available for communication device 200 to communicate with network device 120. For example, through any of the LANs such as residential network 160, airport network 170, or other network 180 and then through home network 140 and possibly Internet 150, although not required. Such a communication may be an email message, a work order, or a database update, just to name a few examples.

Communication device 200 may also connect with other communication devices (not shown) that are connected to the LAN. For example, communication device 200 might send an email through airport network 170 to home network 140 for delivery to the recipient communication device (not shown) through residential network 160.

Figure 2A:
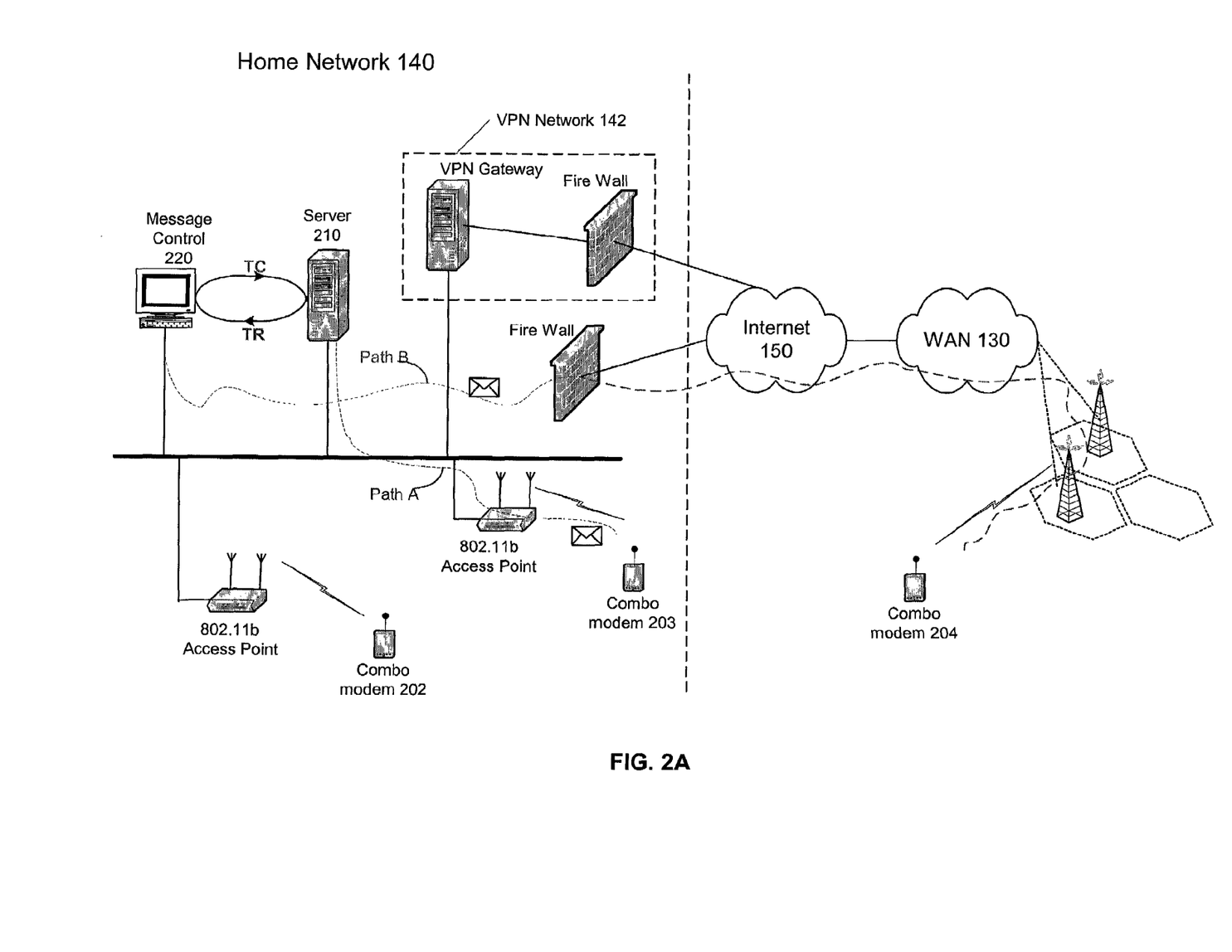
FIG. 2A is a network diagram illustrating various example multi-mode communication devices communicating over a hybrid WAN/LAN network architecture according to an embodiment of the present invention.

FIG. 2A is a network diagram illustrating various example multi-mode communication devices 202, 203, and 204 communicating over a hybrid WAN/LAN network architecture according to an embodiment of the present invention. Multi-mode communication device 204 connects via a wireless network connection through WAN and Internet 150 and multi-mode communication device 202 and 203 connect via an 802.11b wireless access point. Communications between device 204 and the home network 140 may travel directly through a firewall or for enhanced security the communications may travel through VPN network 142.

Information server 210 preferably manages the communications for the various communication devices 202, 203, and 204. A separate message control server 220 may also be employed to perform as a location manager that keeps track of the various communication devices 202, 203, and 204 and how to successfully communicate with those devices. In an alternative embodiment, the message control server 220 may be integrated with the information server 210.

Figure 3:
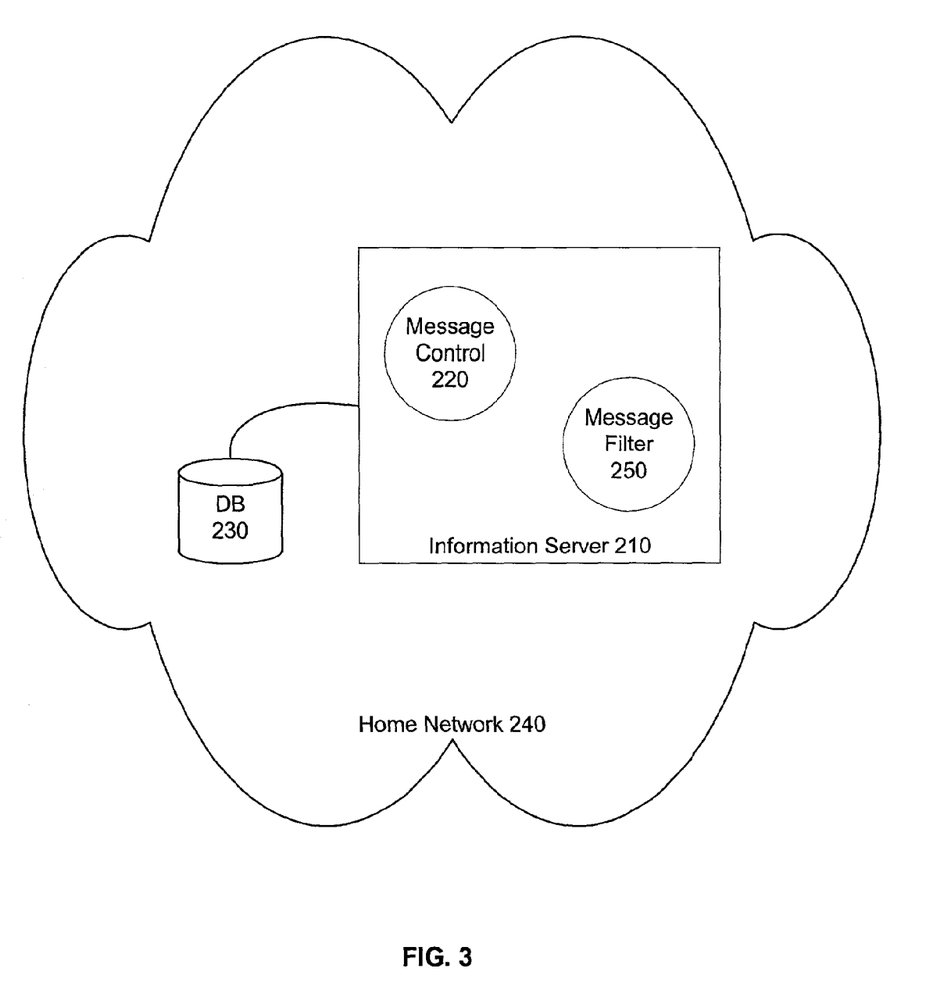
FIG. 3 is a block diagram illustrating an example information server according to an embodiment of the present invention.

FIG. 3 is a block diagram illustrating an example information server 210 according to an embodiment of the present invention. The information server 210 resides within the home network 240 and has access to a storage medium such as database 230. Database 230 can be implemented in memory or in persistent storage, as will be understood by those skilled in the art. Information server 210 preferably contains a message control module 220 and a message filter module 250.

Message control module 220 can be implemented in software, hardware, or some combination of the two. In one embodiment, a complete software solution is employed. The message control module 220 keeps track of registration information pertaining to the communication devices that identify home network 240 as the preferred network. For example, message control module 200 can maintain a database of records, one record for each discrete communication device. A unique identifier is preferably assigned to each communication device, for example a telephone number or an IP address can be used. When a communication device is active on a network, a registration message is sent to the information server 210 and passed along to message control module 220. The message control module 220 can then update database 230 with the location information for the particular communication device.

Message filter module 250 provides the additional function of comparing messages to an established set of parameters to determine if the message should be forwarded on to the communication device at the current registered network. For example, if the message contains a large attachment and has a low priority, the message may not be forwarded to the communication device when the communication device is connected to a low speed, low bandwidth LAN.

Figure 4:
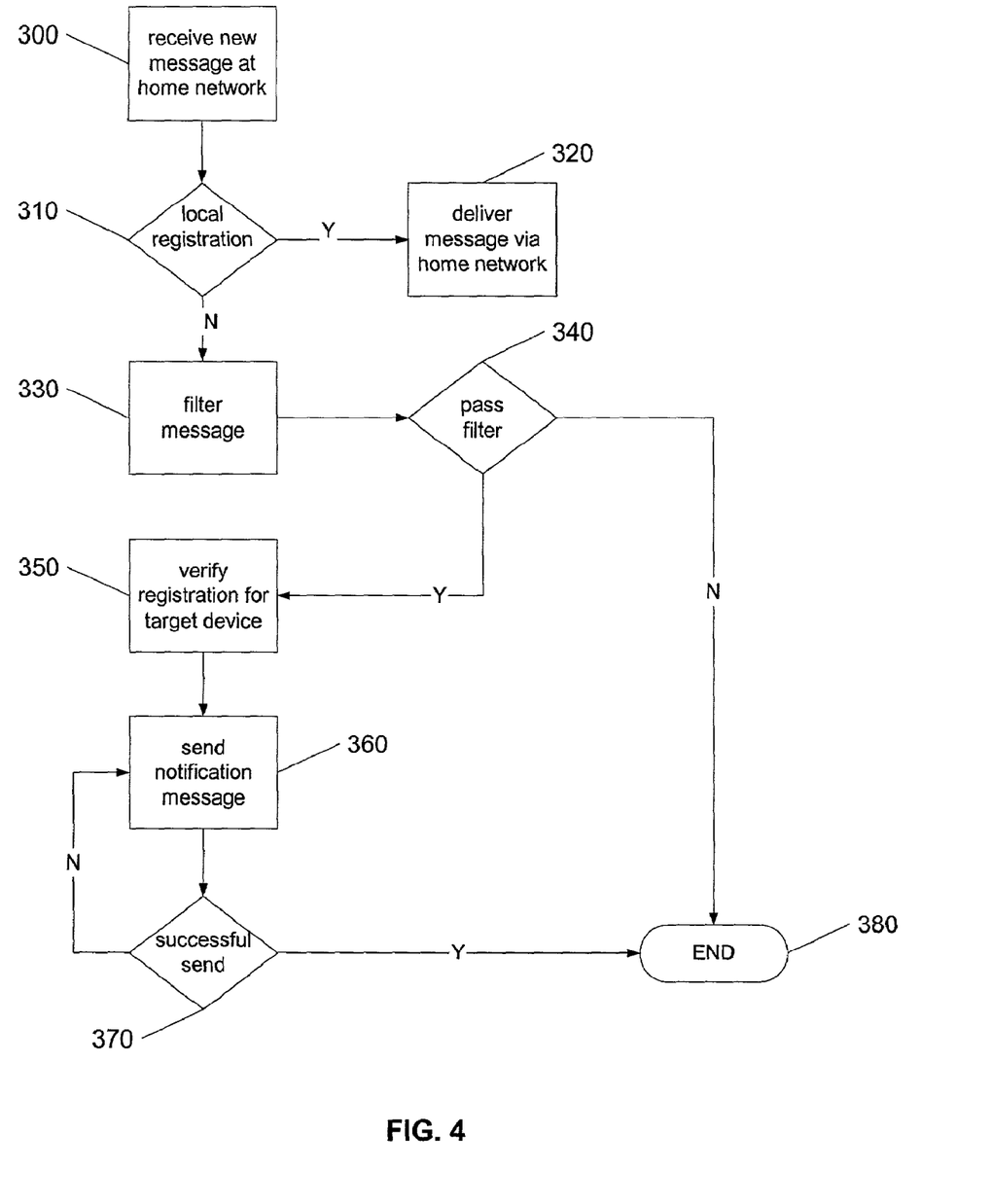
FIG. 4 is a flow diagram illustrating an example process for providing a notice message to a multi-mode communication device according to an embodiment of the present invention.

FIG. 4 is a flow diagram illustrating an example process for providing a notice message to a multi-mode communication device. Initially, in step 300, the home network receives a new message destined for the communication device. The message may be received from an outside network such as a carrier network WAN or a peer LAN or the Internet. The message may also be received from a network device connected to the home network. The format and content of the message may range from a simple email to a database query response or a work order form.

The home network preferably receives the message at a message control module. The message control module performs a lookup in a data storage area to determine the local registration of the communication device, as illustrated in step 310. In one embodiment, the database may contain an entry or field that identifies whether the communication device is connected to the home network or to another network. Additionally, if the communication device is connected to another network, the database preferably includes characteristic information for that network such as the bandwidth, speed, capabilities, and protocol.

If the message control module determines that the communication device is connected to the home network, then the message is delivered to the communication device via the existing channels in the home network, as shown in step 320. If the message control module determines that the communication device is connected to another network, then the message is filtered, as illustrated in step 330. The filtering process may be handled by a message filter module. Preferably, the message filter module can retrieve the characteristics of the device's current network from the database to determine how to filter the message. Additionally, the database may contain a set of preferences for how to optimally filter the message for the particular network. For example, the preferences may be set for the size of the message (including any attachments), the priority, the sender, or other attributes associated with the message. There may also be a default set of filtering preferences to be used in the case where no specific preferences have been set for a particular network.

Once the message has been filtered, the message filter module determines if the message is still to be sent to the communication device, as shown in step 340. If the message did not pass the filter, for example because it had a large attachment file, then the message is not delivered and the process is complete, as shown in step 380. In such a case, the message is maintained at the home network for later delivery, for example the next time the communication device is locally connected to the home network.

If the message does pass the filter, then the message control module verifies the registration for the communication device, as seen in step 350. In doing so, the message control module preferably determines what network the communication device is connected to and also the current local address of the communication device. For example, a current local address can be the telephone number for the device or a network address. This information may advantageously be maintained in the database. Additionally, the message control module may test the communication link between the networks, for example by sending a test message to verify the connection status and robustness of the connection.

Once the communication device has been located on an external network, the message control module constructs a notification message representative of the complete message and sends that notification message to the communication device, as illustrated in step 360. In one embodiment, the notification message can be an SMS message that is sent to the communication device over the WAN. Preferably, the notification message includes some cursory information about the complete message. For example, the notification message for an email message may include the name of the sender, the subject line, and the priority of the message. Additionally, the notification message for a work order may include the client number and the priority.

Once the notification message has been sent, the message control module waits to receive an acknowledgement that the notification message was received, as shown in step 370. If no acknowledgement is received, another notification message can be sent and the process repeated until the communication device is notified of the existence of the complete message at the server. When a successful acknowledgement is received with respect to the notification message, the process ends, as shown in step 380.

Figure 5:
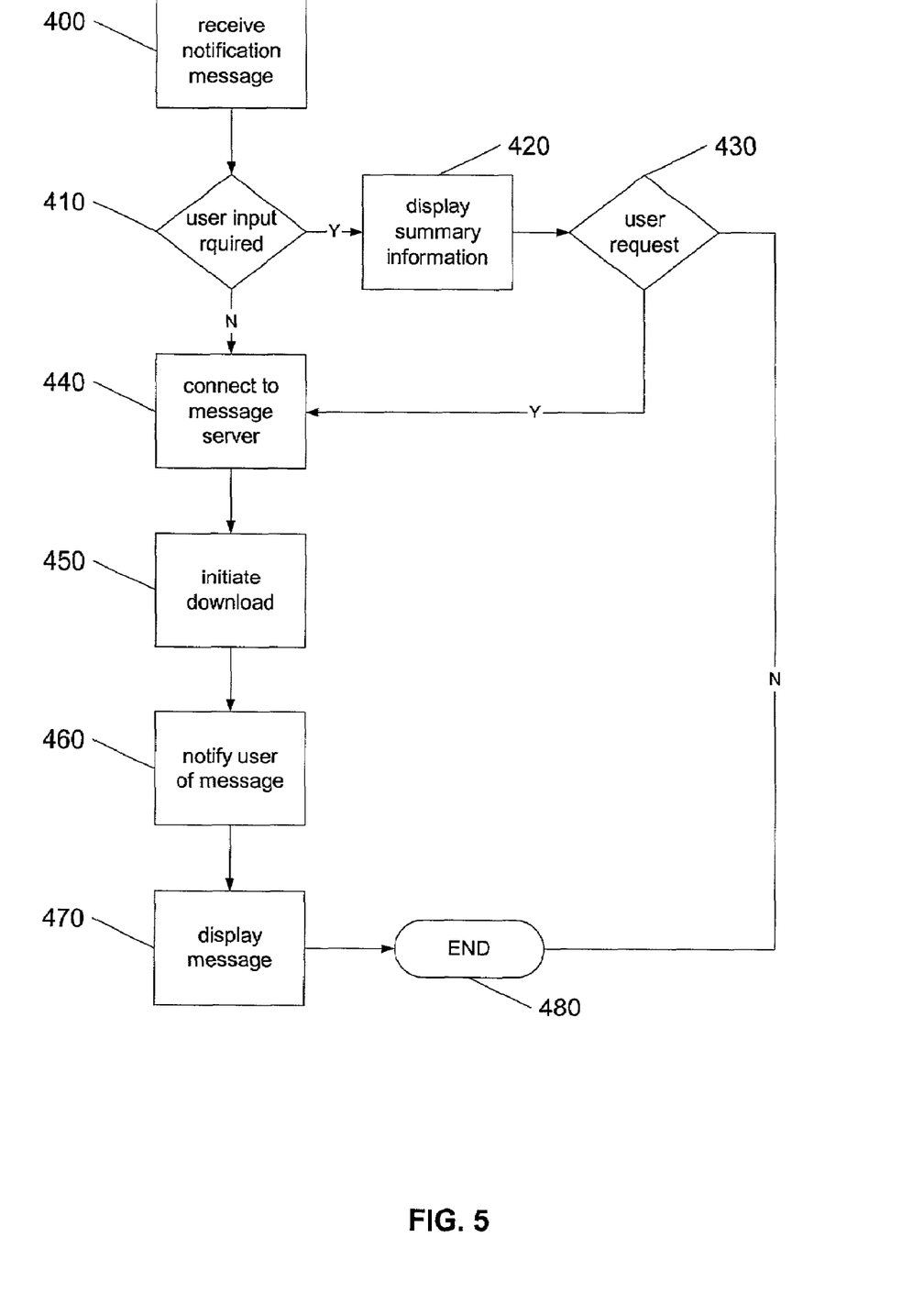
FIG. 5 is a flow diagram illustrating an example process for a multi-mode communication device to retrieve a complete message according to an embodiment of the present invention.

FIG. 5 is a flow diagram illustrating an example process for a multi-mode communication device to retrieve a complete message. Initially, in step 400, the communication device receives a notification message. The notification message can be received from a central information server on a preferred home network. The notification message may also be received from an information server on another network.

In one embodiment, the notification message can be an SMS message sent to the communication device over a WAN connection. The mechanics of sending an SMS message to a wireless communication device are well known and will therefore not be discussed. Alternative formats for the notification message may also be employed, including an internet control message protocol ("ICMP") message. The communication device is configurable to parse the alternative formats of the notification message to obtain the information contained within the notification message. In one embodiment, the notification message includes summary information pertaining to the complete message. Preferably, enough summary information is included to allow the communication device to determine if the complete message should be retrieved.

The communication device may include a parsing utility to obtain the summary information from the notification message. This utility may be implemented in hardware or software or some combination of the two. For example, in one embodiment, a firmware solution may be employed to parse notification messages. In one embodiment, parsing may comprise a comparison of the notification message to a predefined footprint set for messages to be retrieved.

Once the notification message has been received, it may first be decrypted prior to being parsed and processed. Encryption of the notification message may be employed in order to provide comprehensive security for the complete delivery of messages to the multi-mode communication device. After the notification message has been decrypted (if necessary) user input may be required to instruct that the complete message be retrieved, as shown in step 410. For example, there can be a set of customizable parameters that are set to establish a threshold for determining if user input is required. In one embodiment, such parameters may include the size of the message, the priority of the message, the sender, and message type, just to name a few. The parameters are obtained by parsing the notification message.

If user input is required, the summary information from the notification message is displayed, as illustrated in step 420. Preferably, the summary information allows the user of the communication device to provide instructions to either obtain the complete message or to not obtain the complete message, as shown in step 430. If the users elects to not obtain the complete message, the process is complete, as shown in step 480. In such a case, the complete message remains on the information server for later delivery.

If the user requests that the complete message be obtained, or if no user input is required, the communication device establishes a connection with the information server, as seen in step 440. One example of when no user input is required is when the total size of the message is less than a previously set amount. For example, a customizable parameter may be set to automatically accept any complete message with a total size of less than 100 bytes. Thus, if the notification message indicates that the total size of the complete message is under the established threshold, then no user input is required and the complete message can be automatically retrieved.

Sophisticated use of the parameters may be advantageously employed so that a parameter such as message size may vary dependent upon the current connection speed or current connection bandwidth for the communication device. For example, a low throughput network connection on a LAN may dynamically decrease the message size parameter while a large bandwidth, high speed connection may dynamically increase the message size parameter.

In step 440, the communication device connects with the information server. This connection may be an open connection or a secure connection. For example, the communication device may establish a secure VPN connection with the home network so that any message transfer is completely protected. In one embodiment, the VPN session may be established in the background, without the knowledge of the user. Additionally, the connection with the information server may use a separate channel than the channel used to receive the notification message. For example, the notification message may come through a WAN connection, using SMS, while the server connection may be established through a LAN using TCP/IP.

Once the connection has been established, a download is initiated to obtain the complete message, as illustrated in step 450. In one embodiment, a message request may be sent to the information server requesting the specific message corresponding to the notification message. In such an embodiment, a unique message identifier may advantageously be included in the notification message. Additionally, the communication device may request that all pending messages be delivered, to maximize the use of the connection. When the download is complete, or enough information has been received to begin presenting the message to the user, the communication device can notify the user that a new message has been received, as shown in step 460.

The notification may take a variety of forms, including audio notification such as a beep, a voice synthesis, or a pre-recorded message. The notification may also be visual such as a blinking light, presence of an icon, and the like. The communication device may also vibrate or take some other action to notify the user that a complete message has been received. Once the complete message has been received, the message may be displayed, as illustrated in step 470. Displaying the message ends the process, as shown in step 480. In one embodiment, the message can be automatically displayed. Alternatively, the message may not be displayed until some affirmative input from the user is received.

An example of the above described process in use may start with a communication device receiving an SMS message over the WAN. The WAN may be a GPRS network. Once the SMS message is received, the message is parsed to determine the characteristics of the complete message. The characteristics may be compared to a set of parameters or a "footprint" that establishes the threshold for complete messages that are to be retrieved.

When the parsed parameters meet the criteria to retrieve the message, the communication device may launch a local message retrieval application such as an email application. In one embodiment, the PDA function of the device may be in a power down state and thus the PDA may be powered on by the communication device to initiate retrieval of the complete message. Alternatively, the message retrieval application may be running dormant in the background, and "woken up" by the communication device to initiate message retrieval.

The communication device next establishes a connection with a LAN for data retrieval. This connection may be with the home network or with another local network such as a residential LAN or an airport LAN. The connection may be an open public connection or a secure private connection. Once the connection is established, the complete message is retrieved and the user is notified of the new complete message.

Figure 6:
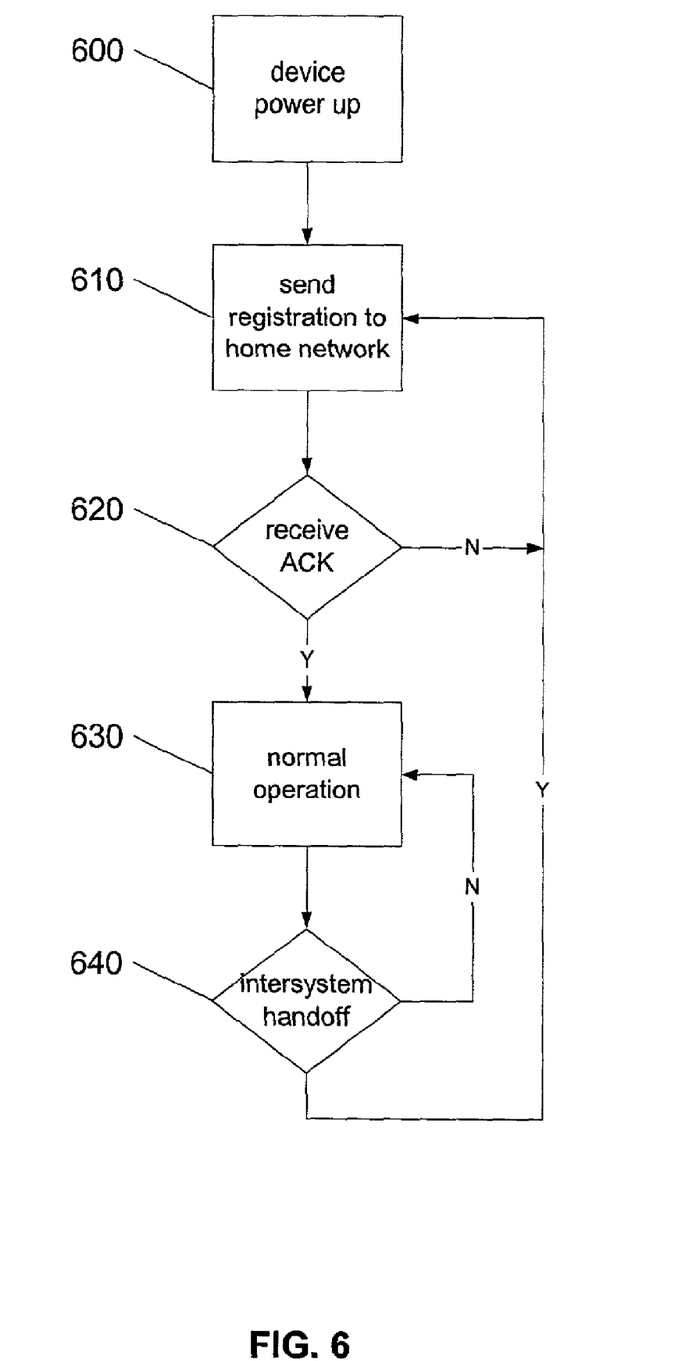
FIG. 6 is a flow diagram illustrating an example process for a multi-mode communication device to provide location information according to an embodiment of the present invention.

FIG. 6 is a flow diagram illustrating an example process for a multi-mode communication device to provide location information. Initially, in step 600, the communication device is powered on. Upon power up, the communication device acquires a local network to determine the service capabilities or functional capabilities. For example, the communication device may acquire one or more available WANs and one or more available LANs. Where more than one network is available, the communication device preferably selects the optimal network, considering cost and performance and perhaps other parameters established by the user, for example.

Once a network connection has been established, the communication device sends a registration message to the home network, as illustrated in step 610. The registration message may be an SMS message travelling over a WAN or an IP message travelling over a LAN. The registration message is preferably routed to a message control module on an information server in the home network. The device then waits to receive an acknowledgement that the registration message was received, as shown in step 620. If the acknowledgement is not received within a predefined period of time, an additional registration message is sent and the process repeats until an acknowledgement is received.

At this point, the communication device enters into normal operation mode, as shown in step 630. As is the nature of mobile wireless communication devices, the communication device may change locations and eventually move out of the geographic area covered by a particular network. For example, the communication device may initially register within a residential LAN such as a home RF network. Later, the device may be taken to an airport and subsequently connect to the airport LAN. In between the residential LAN and the airport LAN, the device may have been connected to a corporate LAN (e.g., the home network).

Each transition between networks causes the communication device to perform an intersystem handoff. An intersystem handoff may be initiated automatically based upon the geographical location of the communication device (e.g. the device moves from one location to another). Additionally, an intersystem handoff may be required by the carrier (e.g. for capacity reasons) or forced by the user (e.g. user selection of a particular network, perhaps for cost, speed, quality, or bandwidth reasons). As will be understood by one having ordinary skill in the art, the intersystem handoff seamlessly shifts the network connection for the communication device from one network to another network. For example, from the residential LAN to the corporate LAN to the airport LAN.

As shown in step 640, while no intersystem handoff is required, the communication device remains in normal operation and the original registration for the communication device remains valid. Once an intersystem handoff occurs, the communication device sends a new registration message to the home network, as illustrated in step 610. The registration process then completes with an acknowledgement as described above and the communication device moves into normal operation while the communication device remains in the same network. In this fashion, the home network may advantageously keep track of the network within which the communication device is in operation.

Figure 7:
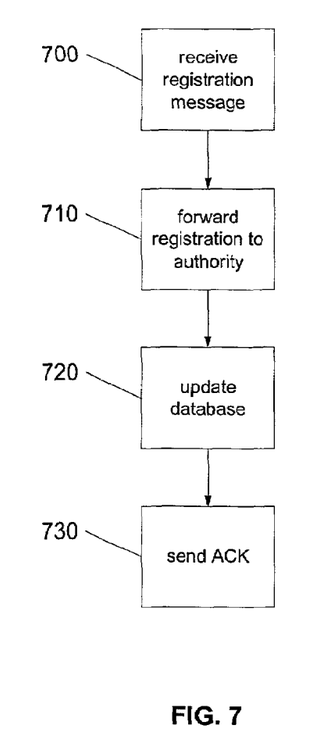
FIG. 7 is a flow diagram illustrating an example process for maintaining a database of location information according to an embodiment of the present invention.

FIG. 7 is a flow diagram illustrating an example process for maintaining a database of location information. Initially, in step 700, an information server in the home network receives a registration message from a communication device, as illustrated in step 700. The message may be an SMS message received via a WAN or an IP message received via a LAN. Once the message is received, it is preferably routed to a message control module or some other registration authority, as shown in step 710.

In step 720, the registration authority updates the registration information. The registration information may be maintained in a database located in memory or in persistent storage. Various techniques for maintaining the location information may be employed, the function of the registry being to track current location information for communication devices. The information stored in the database may advantageously include a network address, a telephone number, or other information that uniquely identifies the communication device and its current network.

Once the database or registry has been updated, the message control module preferably sends an acknowledgement to the communication device to complete the registration process, as illustrated in step 730. This process may be repeated for each subsequent re-registration caused by an intersystem handoff executed by the mobile communication device.

Figure 8:
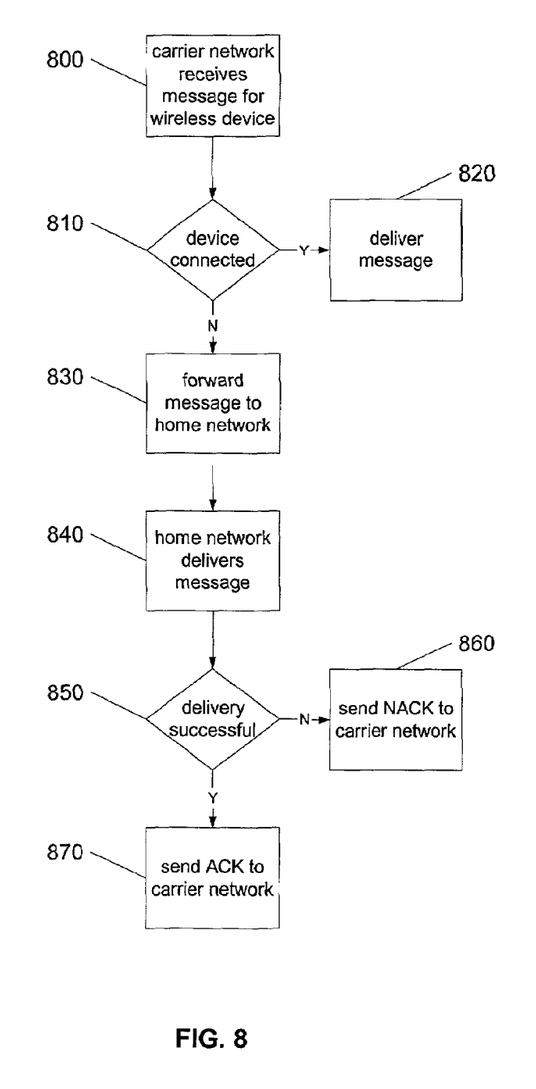
FIG. 8 is a flow diagram illustrating an example process for a network to deliver a complete message to a multi-mode communication device on another network according to an embodiment of the present invention.

FIG. 8 is a flow diagram illustrating an example process for a carrier network to deliver a complete message to a multi-mode communication device on a remote network. Initially, in step 800, the carrier network receives the complete message destined for the communication device. The message may be received from a network device connected to the Internet, from a network device directly connected to the carrier network (e.g., a cell phone or PDA), or from a network device connected to another network. For example, a carrier network may offer text based messaging services through a web site that allows network devices with web access to send messages to a communication device.

Once the complete message has been received, the carrier network determines if the communication device is connected to the carrier network, as shown in step 810. If the device is connected, then the complete message is delivered directly to the communication device, as illustrated in step 820. If the device is not connected to the carrier network (e.g., out of range or connected to another network), then the complete message is forwarded to the home network for processing and ultimate delivery, as seen in step 830.

Once the home network receives the complete message from the carrier network/WAN, the home network may deliver the complete message to the communication device as previously described with respect to FIG. 4. In certain cases, the complete message may not be delivered to the communication device due to message size, priority, or other attributes of the complete message as previously described.

Upon successful resolution of the delivery process in the home network (including successful delivery or successful non-delivery), as shown in step 850, the home network sends a status message to the WAN. If the delivery of the complete message was not successful for any reason, the home network sends a negative acknowledgement to the WAN, as illustrated in step 860. Of course, the home network may attempt to send the message several times prior to determining that the delivery of the complete message was unsuccessful. If the delivery of the complete message was successful, the home network sends an acknowledgement to the WAN, as shown in step 870. In one embodiment, a successful non-delivery may occur when the communication device received notice of the complete message but elected not to retrieve the complete message.

While the particular systems and methods for complete message delivery to a multi-mode communication device herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for registering a communication device, comprising:
    receiving a network registration message from a communication device, the registration message having a device identifier and a device status of the communication device;
    parsing the registration message to determine the device identifier and the device status;
    querying a database to retrieve a database record corresponding to the communication device, the database record having a device status; and
    updating the device status in the database record, the device status comprising at least one of device location status and current device network connection status.

2. The method of claim 1, wherein the network registration message is received as a simple messaging system (SMS) message.

3. The method of claim 1, wherein the network registration message is received as a Transmission Control Protocol/Internet Protocol (TCP/IP) message.

* * * * *